United States Patent Office 3,142,134
Patented July 28, 1964

3,142,134
BIOLOGICAL PREPARATION
Sanford M. Siegel, White Plains, N.Y., assignor to Union
Carbide Corporation, a corporation of New York
No Drawing. Filed May 1, 1961, Ser. No. 106,443
16 Claims. (Cl. 47—58)

This invention relates to a biological preparation useful in the treatment of plants. More particularly, this invention relates to a preparation useful in protecting plants against atmospheric contamination.

It is well known that the atmosphere contains oxidizing substances, such as ozone, peroxides, nitrogen oxides and the like, which adversely affect plant life. However, the degree of atmospheric contamination will vary from area to area. For example, in smog-ridden urban areas such as Los Angeles or Washington, D.C., the percentage of airborne contaminants will be much higher than in rural areas and the damage to plant life will be proportionally greater. The problem, however, can never be said to be completely non-existent in any area.

The oxidizing substances or agents residing in the atmosphere or in solutions in contact with the atmosphere may be termed, for convenience only, as "airborne oxidants," or "oxidizing air pollutants." The harmful effects of heavy concentrations of the "airborne oxidants" or "oxidizing air pollutants" are characterized by eye and respiratory irritations in humans and by adverse effects on certain non-living materials such as, for example, rubber, in which deterioration is often accelerated. Adverse effects on plants are even more pronounced. These are characterized by leaf discoloration and malformation, inhibition of growth, and reduction in crop yields. In extreme cases, such airborne pollution can be lethal to plant life. It should be noted that tobacco plants are particularly susceptible to injury as a result of high ozone concentration. The presence of oxidizing air pollutants near ground levels is established by chemical measurements and by the transverse cracking of shaded, looped rubber strips placed in proximity to crop plants in the field.

Another air pollutant particularly harmful to plant life in areas where soft coals are burned or sulfide ores roasted, is sulfur dioxide. In this regard, dosages of about 3 parts per million, which have been recorded in such locations are deemed harmful to living matter.

In addition to the aforesaid materials another factor causing harmful effects on plant life is ultraviolet radiation. In this regard, dosages appreciably in excess of approximately $10^5$ erg/mm.$^2$ are deemed detrimental. Such excess radiation occurs widely as an integrated dosage during the growing season in areas such as the central plains of the United States and in semi-arid, desert or semi-arid elevated areas such as the Colorado Plateau or the irrigated districts of southern California.

It is an object of this invention to provide a process and preparation for treating plants.

It is a particular object of this invention to provide a process and preparation for arresting and substantially counteracting the contamination of vascular plants by airborne oxidants or oxidizing air pollutants.

It is another object of this invention to provide a process and preparation for protecting plants against excessive ultraviolet radiation and airborne quantities of sulfur dioxide.

Other objects will become apparent from the following description and appended claims.

According to this invention, a biological preparation for arresting and substantially counteracting the contamination of vascular plants by atmospheric contaminants comprises the emulsified mixture of an effective amount of a water-insoluble phenol or polymeric phenol, with a gas-permeable film-forming synthetic polymeric carrier in the latex form, i.e. as a stabilized emulsion or dispersion of synthetic colloidal polymer or copolymer particles in an aqueous dispersion medium. By "effective amount" is meant that concentration of protectant or arrestant, i.e. water-insoluble phenol or polymeric phenol, necessary to impart beneficial results, i.e. protection, to the plants being treated. For the practice of this invention, this concentration should range about from 0.3 gram to about 10 grams of protectant per 100 ml. of carrier. Preferably, the concentration of the active component should be from 1 gram to 5 grams per 100 ml. of carrier.

It is to be noted that the term "water-insoluble phenol" is defined by ordinary usage, i.e. phenol and polyhydroxy substituted derivatives thereof are clearly "water-soluble." On the other hand, alkyl-substituted monohydric phenols, wherein the substitution is ortho and/or para to the phenolic hydroxyl group are clearly "water-insoluble." Illustrative of water-insoluble phenols useful in the practice of this invention are ortho-, meta-, and para-cresols, 2,4-dimethyl phenol, 2,6-dimethyl phenol, 2,4,6-trimethyl phenol, 4-n-butyl phenol, 2,4,6,-tritertiarybutyl phenol, the isomeric methyl isopropyl phenols; and 4-n-octyl phenol.

Similarly, the term "polymeric phenols" is also defined by ordinary usage, i.e. polymers consisting of hydroxybenzene units joined in linear array by methylene groups. Polymers containing an average of between 4–10 rings and more particularly those resins designated by the term "novolacs" are particularly suitable for the practice of this invention. The novolac resins are prepared by conventional procedures, such as the reaction between phenols, e.g. phenol, p-cresol and other p-alkyl phenols, singly or in combination, with the linking agent or co-monomer, formaldehyde, in the presence of either an acid or alkaline condensation catalyst.

Illustrative of the "novolac" resins useful in the practice of this invention are phenol-formaldehyde, p-cresol formaldehyde, p-phenylphenol-formaldehyde, p-tert-amylphenol-formaldehyde and p-tert-butylphenol-formaldehyde resins.

The protective effects of the alkyl phenols and the phenolic resins towards both oxidizing, e.g. ozone, and non-oxidizing, e.g. sulfur dioxide, air pollutants, are based upon the bifunctional character conferred upon these substances by the presence of the phenolic hydroxyl group and the ortho or para alkyl, or ortho methylene group, in the same molecule. Both groups contribute to the antioxidant characteristic. In addition the benzylic character of the alkyl group in these phenols renders feasible the reaction with sulfur dioxide as well.

For the practice of this invention, the synthetic latex polymeric carrier for the phenolic protectant or arrestant may vary widely provided it is of the type which, in films of about 1 mil thickness, will allow the passage of at least 100 cc. of oxygen and/or $CO_2$ (since the vital process comprises the interflow of each) per 100 square inches of film area per 24 hour period.

The synthetic latex carriers prevent dispersal or dilution of the protectant or arrestant by wind, dew, and rain, and allow it to be uniformly distributed over the plant surface at the time of application, and thereafter as the plant surface increases during growth. Moreover, the synthetic latex carriers have been found to possess protective properties in themselves. However, it has also been found that surprisingly the mixture of phenolic arrestant with synthetic latex effectively adds to the qualities of each and results in a biological preparation having enhanced protective and arrestive properties. This will be more fully indicated in the examples hereafter included.

It is to be understood that the required criteria of "gas-permeability" for the synthetic latex carriers is for reference purposes only and is not to be indicative of the thickness of the film applied to the plant. The latter naturally will be determined by the nature of the carrier, the method and circumstances of application, and the type of plant surface to which the inventive preparation is applied. In general, the film deposited on the plant should range from .1 mil to 1 mil in thickness. For practicality, if the inventive composition is applied to the plants until dripping begins, the resulting film will have the thickness desired.

The use of synthetic aqueous latices rather than film-forming polymers dissolved in organic solvents is governed by the non-toxicity of water as a solvent since living plants are to be contacted. The common organic solvents which would be employed in conjunction with film-forming polymers include mineral spirits, acetone, methylethyl ketone, amyl acetate, butyl alcohols, and the like, all of which are themselves toxic to plants.

Illustrative of those polymers or copolymers particularly useful in forming the synthetic latex carriers for the phenolic protectants of this invention are homopolymers of vinyl esters, acrylate esters and/or polyethylene, or copolymers containing vinyl and/or acrylic esters and other polymers in combination therewith. For example, vinylacetate-ethylhexyl acrylate copolymers; acrylic acid-styrene-ethylhexylacrylate copolymers; and polyethylene homopolymers are particularly useful in the practice of this invention. Representative of the additives which can be employed in stabilizing the emulsions or dispersions are methylcelluloses, alginic acid, and agar-agar.

Particularly preferred preparations for the practice of this invention are those obtained by the combination of a phenolic-formaldehyde resin with a synthetic latex carrier, containing a copolymer composed of 75 to 85% of vinyl acetate, and from 25 to 15% of ethylhexyl acrylate; or a styrene-ethylhexyl acrylate-acrylic acid copolymer. These compositions may be diluted with water. In this regard, acceptable concentrations will contain from 0.5% to 11% by weight of the solids in water. However, the amount of phenolic resin contained in the protective mixture should preferably be between 0.3 and 10 grams per 100 ml. of latex. Particularly preferred are those compositions containing from 1 to 3 grams of resin per 100 ml. of a synthetic latex (containing 2–5% solids).

The protective composition of this invention can be prepared in any manner consistent with standard practices for preparing biological preparations. For example, the preferred compositions of this invention may be prepared by adding 3 grams of a phenol-formaldehyde resin, containing 5 phenolic residues per molecule, to 100 ml. of an 85% vinyl acetate-15% ethylhexylacrylate latex, containing 3% solids. The mixture may then be stirred manually or mechanically for 1 hr. This mixture may contain undispersed phenolic resin which can be retained or removed by filtration or settling. The protective composition so prepared can be used directly as a dip, may be painted or sponged onto the plants or may be applied by hand or high pressure spray equipment. Excess liquid should be allowed to drip to drain away. The protective film will then form on the treated plant as the applied composition dries in air. Until dry the coated surface must not be exposed to rain, but can be so exposed without loss of effectiveness after drying.

As indicated previously, the latex carriers of this invention, even when employed alone, effect advantageous results when applied as a thin protective film or coating on plants. However, according to this invention, this effect is sharply enhanced when mixed with the phenolic resins previously defined. This can be illustrated in the following table, but will be more fully indicated in the examples which follow.

| Hazard | Effect of Latex Only | Effect of Latex-Phenolic |
| --- | --- | --- |
| Ozone | Poor | Excellent. |
| Ultraviolet | do | Do. |
| Sulfur dioxide | Moderate | Moderate. |
| Desiccation | Good | Good. |

As can be seen from this table, the latex-phenolic protective preparation results in particularly effective protection against the hazards indicated. The terms "poor," "moderate," "good," and "excellent" may be respectively defined as follows:

"Poor" denotes, in general, less than 15% reduction in damage under test conditions.

"Moderate" denotes, in general, 15–40% reduction in damage under test conditions.

"Good" denotes, in general, 40–70% reduction in damage under test conditions.

"Excellent" denotes more than 70% reduction in damage under such conditions.

The generally superior effectiveness of the latex-novolac composition as a plant protectant can be explained. It has surprisingly been found that this composition provides a film remarkably similar to cutin, which is the intermediate member of a family of highly-resistant, natural coating materials produced by plant cells. Moreover, the film provided by the latex-novolac composition is functionally equivalent to the natural coating, i.e. it allows growth and hence the exchange of oxygen and carbon dioxide; it retards water loss; and it serves as an ultraviolet and toxicant barrier. However, as shown above, and in the examples which follow, it is not merely equivalent in its bioprotective features, but is superior to the natural coating, i.e. it enables the plant to survive environmental stresses which would overcome its natural defense.

The phrases "arresting" and "substantially counteracting" are to be understood as including protection against the atmospheric conditions described heretofore and embodied in terms such as "smog," "oxidizing air pollutants," "ultraviolet radiation," and the like. The manifestations of exposure to these atmospheric conditions are indicated by conditions such as wilting, necrosis, and the malformation and discoloration of leaves, stems or derivative organs. They also include the inhibition of seed germination and root growth; the inhibition of seedling growth and development; the inhibition of vegetative and flower buds; and the death of seeds, plants or their parts.

The term "plant" is to be understood as encompassing only the usual manifestations of this term, i.e. vascular plants. In addition, the treatment of the plants will necessarily include the soil media or hydroponic media therefor. The latter are included since the end product of the application will necessarily be the plant. It is to be also understood that the scope of this invention includes treating the whole plant or any part thereof, including leaves, stems, flowers, or fruits.

The following examples will further serve to illustrate the practice of this invention.

EXAMPLE 1

A series of tests were conducted to demonstrate the effect of ozone, on uncoated, latex-coated and latex-novolac (phenol-formaldehyde resin) coated, nine to fourteen day old cucumber seedlings. The results are indicated below in Tables I through IV. "Latex-1" contains an 85% vinyl acetate, 15% ethylhexylacrylate copolymer, total solids, 55% by weight. Latex-2 contains a styrene-ethylhexylacrylate copolymer, total solids 50% by weight. The dilutions are with water.

The tests comprised immersing cucumber seedlings in solutions of buffer salts or in the indicated latex emulsions containing the phenolic protectant. These immersed roots were then allowed to mature into ten to 12 day old seedlings. The young plants were thereupon exposed for 30 minutes to approximately $40-100 \times 10^{-6}$ moles/liter of ozone in a sealed 30 liter chamber.

Table I

| Protective Treatment (Painted on) | Percentage of Plants Dead or Severely Damaged | Percentage of Plants Moderately Damaged | Percentage of Plants Slightly or Not Damaged |
|---|---|---|---|
| None * | 77 | 7 | 16 |
| Latex-1 | 36 | 48 | 16 |
| Latex-1 diluted five fold | 27 | 45 | 28 |
| 11% Latex-1 plus 5 gms./100 ml. novolac | 5 | 45 | 50 |

* Average for all controls not receiving treatment.

Table II

| Protective Treatment (Painted on) | Percentage of Plants Dead or Severely Damaged | Percentage of Plants Moderately Damaged | Percentage of Plants Slightly or Not Damaged |
|---|---|---|---|
| None * | 77 | 7 | 16 |
| 11% Latex-1 plus 10 grm./100 ml. novolac | 0 | 16 | 84 |

* Average for all controls not receiving treatment.

Table III

| Protective Treatment (Sprayed) | Percentage of Plants Dead or Severely Damaged | Percentage of Plants Moderately Damaged | Percentage of Plants Slightly or Not Damaged |
|---|---|---|---|
| None * | 89 | 7 | 4 |
| Latex-1 diluted five-fold | 33 | 23 | 44 |
| 11% Latex-1 plus 10 grs./100 ml. novolac | 42 | 2 | 56 |
| 11% Latex-1 plus 5 grs./100 ml. novolac | 28 | 16 | 56 |
| 11% Latex-1 plus 10 grs./100 ml. novolac | 28 | 2 | 70 |

* Average for all controls not receiving treatment.

Table IV

| Protective Treatment (Dipped) | Percentage of Plants Dead or Severely Damaged | Percentage of Plants Moderately Damaged | Percentage of Plants Slightly or Not Damaged |
|---|---|---|---|
| None * | 60 | 0 | 40 |
| 11% Latex-1 plus 10 gr./100 ml. novolac diluted 10 fold | 0 | 10 | 90 |

*Average for all controls not receiving treatment.

EXAMPLE 2

A series of tests were conducted to demonstrate the effect of ozone on various ornamental plants. The results are indicated below in Tables V–VIII.

Table V.—Chrysanthemum

| Protective Treatment (Sprayed) | Percentage of Leaves Dead | Percentage of Leaves With Area >33% Blackened | Percentage of Leaves With 10–33% Blackened | Percentage of Leaves With < Area Blackened |
|---|---|---|---|---|
| None | 15 | 20 | 39 | 26 |
| 11% Latex-1 plus 10 gr./100 ml. novolac | 0 | 4 | 13 | 83 |

Table VI.—Euonymus coloratus (Woody Shrub)

| Treatment (Sprayed) | Percentage of Leaves Intact | Percentage of Leaves Abscissed |
|---|---|---|
| None | 57 | 43 |
| 11% Latex-1 plus 10 grams/100 ml. novolac | 74 | 26 |

Table VII.—Ligustrum (Woody Shrub)

[Observations after 1 hour]

| Treatment | Percentage of Leaves With > 33% Area Blackened | Percentage of Leaves With 10–33% Area Blackened | Percentage of Leaves With < 10% Area Blackened |
|---|---|---|---|
| None | 52 | 18 | 30 |
| 11% Latex-1 plus 5 grs./100 ml. novolac | 8 | 24 | 68 |

Table VIII.—Ivy (Hedera)

[Observations after 6 days]

| Treatment | Percentage of Leaves Fallen | Percentage of Leaves Browned | Percentage of Leaves Mottled | Percentage of Leaves Normal |
|---|---|---|---|---|
| None | 19 | 53 | 28 | 0 |
| Latex-1 diluted five fold | 23 | 0 | 72 | 5 |
| 11% Latex-1 plus 10 grams/100 ml. novolac diluted 10 fold | 14 | 0 | 63 | 23 |
| 11% Latex-1 plus 10 grams/100 ml. novolac | 0 | 0 | 10 | 90 |

EXAMPLE 3

Red ripe Baldwin apples of about 6 cm. diameter were exposed to ozone treatment for 100 min. After 4 days, a pattern of discoloration consisting of brown pits, 1–2 mm. in diameter, 0.2 mm. in depth had developed. For areas of 100–120 cm.$^2$, the following counts (pit/apple) were observed employing untreated and variously coated apples. The results are indicated below:

Table IX

| | |
|---|---|
| Untreated | 1156 |
| Latex-1 diluted 5 fold | 27 |
| Latex-2 diluted 5 fold | 20 |
| 11% Latex-1 plus 10 grams/100 ml. novolac diluted ten fold | 31 |
| 11% Latex-1 plus 10 grams/100 ml. novolac diluted ten fold | 16 |
| 10% Latex-2 plus 5 grams/100 ml. novolac | 15 |

EXAMPLE 4

Heads of lettuce were given standard ozone exposure after about one-half of their surfaces had been coated with an 11% Latex-1 plus 10 gram/100 ml. novolac composition. At one hour after treatment, the untreated half was about 50% covered with collapsed, shiny brown areas, the remainder being faded to pale green. The protected half showed less than 10% discoloration and approximately normal green color.

EXAMPLE 5

Six to eight week old tomato plants transplanted 48 hours before treatment and selected for uniformity, were subjected to ozone following the procedure indicated heretofore. The results were tabulated below in Tables X, XI, and XII.

Table X
[Observation after 1 hour]

| Treatment | Percentage Of Leaves Wilted | Percentage of Leaves Normal | Percentage of Leaves Bronzed | Percentage of Leaves Green |
|---|---|---|---|---|
| None | 90 | 10 | 33 | 67 |
| 10% Latex-2 plus 10 grs./100 ml. novolac | 38 | 62 | 11 | 89 |

Table XI
(PLANTS GIVEN 120 MIN. EXPOSURE TO OZONE OF ONE-FIFTH INTENSITY PREVIOUSLY EMPLOYED)
[Observations after 1 hr.]

| Treatment | Percentage of Leaves Wilted | Percentage of Leaves Normal |
|---|---|---|
| None | 54 | 46 |
| 11% Latex plus 1 gr./100 ml. novolac | 11 | 89 |
| 11% Latex-1 plus 5 gr./100 ml. novolac | 19 | 81 |

Table XII
(PLANTS GIVEN ONE-HALF USUAL TREATMENT FOR 120 MIN.)
[Observations after 15 minutes]

| Treatment | Percentage Of Leaves Wilted | Percentage of Leaves Normal | Percentage of Leaves Bronzed | Percentage of Leaves Green |
|---|---|---|---|---|
| None | 50 | 50 | 64 | 36 |
| 10% Latex-2 plus 10 grs./100 ml. novolac | 0 | 100 | 0 | 100 |

EXAMPLE 6

Ivy plants were spray-coated with latex-1, phenolic resin compositions. The phenolic protectant content comprised 3% by weight of either p-cresol, o-cresol or 2,6-dimethyl phenol. These plants were exposed to ozone, and observed after 16 hours. The results were tabulated below in Table XIII.

Table XIII

| Protectant | Percentage of Leaves Discolored Only | Percentage of Leaves Dead | Percentage of Leaves Normal | Condition of Stem Tip |
|---|---|---|---|---|
| None | 50 | 25 | 25 | Brown and dead. |
| Latex-o-cresol | 15 | 5 | 80 | Slight discolor, but alive. |
| Latex-2,6-dimethyl phenol | 16 | 0 | 84 | Normal. |
| Latex-p-cresol | 15 | 10 | 75 | Slight discolor, but alive. |

EXAMPLE 7

Following the procedures outlined in Example 1, cucumber seedlings 12 days old were exposed to ozone. After 16 hours the following results were obtained and indicated below in Table XIV.

Table XIV

| Protectant | Percentage of Plants Wilted | Percentage of Plants Severely Pitted | Percentage of Plants Moderately Pitted | Percentage of Plants With Little or no Damage |
|---|---|---|---|---|
| None | 25 | 30 | 20 | 22 |
| Latex-1,1% 2,4-dimethyl phenol | 20 | 30 | 25 | 25 |
| Latex-1,3% 2,4-dimethyl phenol | 0 | 16 | 37 | 47 |

EXAMPLE 8

An 11% latex containing 3% 2,6-dimethyl phenol and a ten-fold dilution thereof (1% latex-0.3% 2,6 dimethyl phenol) was prepared. Ivy plants were uncoated or spray-coated with these compositions. Observations were made after 16 hours after a 60 minute (double time) ozone treatment. The results were tabulated below in Table XV.

Table XV

| Protectant | Percentage of Leaves Discolored Only | Percentage of Leaves Dead | Percentage of Leaves Normal |
|---|---|---|---|
| None | 75 | 21 | 4 |
| 1% latex-0.3% 2,6-dimethyl phenol | 38 | 16 | 46 |
| 11% latex-3% 2,6-dimethyl phenol | 32 | 4 | 64 |

Therefore, even the very dilute form of novolac-2,6-dimethyl phenol shows good protective activity, although the percentage of dead leaves was not materially reduced.

EXAMPLE 9

A test of the activity of novolac fractions was carried out by separation of water-soluble and residual components. For this purpose, 10 gm. of novolac resin was extracted for 1½ hours with distilled water, and mixed with latex to give an 11% latex containing half-diluted aqueous extract. The residual solid was washed three times with 250 ml. portions of water, pressed dry and mixed with 11% latex to give 10% novolac residue. Ivy plants were spray-coated with these compositions or left uncoated. Plants were given a double time ozone treatment and observed after 24 hours. The results obtained are indicated below in Table XVI.

Table XVI

| Protectant | Percentage of Plants Discolored Only | Percentage of Plants Dead | Percentage of Plants Normal |
|---|---|---|---|
| None | 0 | 100 | 0 |
| Latex-water extract of novolac | 12 | 8 | 80 |
| Latex-residual novolac solids | 40 | 7 | 53 |

These tests indicated that protective activity resides in both novolac fractions; hence protection is not to be ascribed to low molecular weight phenolics alone.

EXAMPLE 10

The utility of novolac resin powder without latex is limited by such factors as rainfall, dews, and wind, all of which will dilute, disperse or remove dusts, powders and other simple particle coverings. (It should be noted that some phenols can be toxic in nature, whereas the novolacs, which are infusible powders, are non-toxic and can be applied directly to the surface of the plant.)

Tests were conducted to ascertain whether the novolac particles could exert protective effects when applied manually as a dust. It is conceivable that some field situations might favor such a mode of application. Accordingly, ivy plants were dusted with novolac, the excess being gently blown off. The amount applied was not known, but was probably between 50 and 500 mg. per plant. Plants were examined 16 hours after ozone treatment.

Table XVII

| Protectant | Percentage of Leaves Discolored Only | Percentage of Leaves Dead | Percentage of Leaves Normal | Condition of Stem Tip |
|---|---|---|---|---|
| None | 0 | 100 | 0 | Browned. |
| Novolac dust | 12 | 0 | 88 | Normal. |

In the Examples 11, 12 and 13 which follow, two protective features of the 85% vinyl-acetate-15% ethylhexylacrylate latex are illustrated. These features are not presented as independent latex film virtues, but as advantages to be considered together with the high level bioprotective functions already indicated. The tests comprised subjecting various coated and uncoated plants to sulfur dioxide. In considering the tests, it should be noted that 3 parts per million of sulfur dioxide has been set as a First Stage $SO_2$ alert by the Los Angeles County Air Pollution Control District. This level is common in soft coal industrial areas of the North Central and Atlantic States. It is detectable at 3 p.p.m. by smell. It is to be also noted that the California State Department of Public Health Air Quality Standard is now 1 p.p.m. $SO_2$ for 1 hr. or 0.3 p.p.m. for 8 hrs.

EXAMPLE 11

English ivy plants were exposed for 20 hrs. to 300 p.p.m. $SO_2$. The results are tabulated below in Table XVIII.

Table XVIII

| Protective Treatment | Percentage of Leaves Bleached | Percentage of Leaves Mottled | Percentage of Leaves Normal |
|---|---|---|---|
| Uncoated | 29 | 12 | 59 |
| Latex (11% solids, sprayed) | 25 | 2 | 73 |
| Latex-novolac (11% latex plus 10% novolac) | 27 | 0 | 73 |

EXAMPLE 12

English ivy plants for 20 hrs. were subjected to 1000 p.p.m. $SO_2$. The results are indicated below in Table XIX.

Table XIX

| Protective Treatment | Percentage of Leaves Bleached | Percentage of Leaves Mottled | Percentage of Leaves Normal |
|---|---|---|---|
| Uncoated | 40 | 34 | 26 |
| Latex (see Ex. 1) | 28 | 38 | 34 |
| Latex-novolac (see Ex. 1) | 25 | 37 | 38 |

EXAMPLE 13

Red ripe tomato fruit were exposed to 1000 p.p.m. $SO_2$ for about 20 hrs. The results are indicated below in Table XX.

Table XX

| Protective Treatment | Color | Softness |
|---|---|---|
| Uncoated | Yellow areas and yellow orange areas. | Skin wrinkled, flesh partially digested, soft and fluid. |
| Latex | Red | Skin wrinkled, fruit soft. |
| Latex-novolac | do | Normal save for slight softening. |

EXAMPLE 14

Tests were carried out to ascertain the amount of protection afforded plants against UV radiation using the protective compositions of this invention. The UV source was a mercury vapor discharge tube—GE sterilamp type—principal wavelength 2537 A. The dosage employed totaled approximately 1,000,000 ergs per mm.$^2$ The following results were obtained following tests on:

(a) Ten day old cucumber seedlings, coated with 11% latex (vinyl acetate-ethylhexylacrylate) containing 10% novolac, or uncoated. These results are indicated in the table below.

Table XXI

| Time After UV Treatment | Percent of Plants Dead or Dying | |
|---|---|---|
| | Uncoated | Coated |
| 0 | 0 | 0 |
| 40 min | 28 | 0 |
| 24 hrs | 100 | <10 |

(b) Plants of English ivy coated with latex-novolac as above, or uncoated. The results are indicated in the table below.

Table XXII

| Time After UV Treatment | Condition of Plants | |
|---|---|---|
| | Uncoated | Coated |
| 5 hrs | Leaves pale, flaccid | Leaves firm, deep green. |
| 18 hrs | All leaves wilted | 10% of leaves flaccid. |
| 24 hrs | 80% of leaves shrivelled | 10% of leaves shrivelled. |
| 72 hrs | 50% of leaves shed | No leaves shed. |

These examples demonstrated that compositions which afford marked protection to plants against airborne oxidants also screen out harmful ultraviolet radiation.

The physical basis for this protective effect is illustrated in Table XXIII below. A comparison was made between a film approximately 0.1 mm. in thickness prepared by drying an 11% vinylacetate-ethylhexylacrylate latex and a similar film prepared from 11% latex containing 1% novolac. The results were tabulated as follows:

Table XXIII

| Wavelength, Angstrom Units | Percent of Ultraviolet Absorbed by— | | |
|---|---|---|---|
| | 1 cm. air | film | Novolac film |
| 2400 | 0 | 55 | 99 |
| 2600 | 0 | 47 | 89 |
| 2800 | 0 | 43 | 95 |
| 3000 | 0 | 39 | 80 |
| 3200 | 0 | 37 | 76 |
| 3400 | 0 | 35 | 75 |

This table shows that the ultraviolet screening properties residing in the polymer film alone are increased markedly by the addition of novolac so that both ultraviolet and smog protection are embodied in the same composition.

It is to be understood that this invention is not only applicable to edible plants but to the non-edible portions thereof and to non-edible ornamental plants, flowers and leaves.

What is claimed is:

1. A process for arresting and substantially counteracting the contamination of vascular plants by atmospheric contaminants which comprises coating at least a surface portion of said plants with an effective amount of a phenolic resin.

2. A process for arresting and substantially counteracting the contamination of vascular plants by atmospheric contaminants which comprises coating at least a surface portion of said plants with an effective amount of an active component selected from the group consisting of water-insoluble alkyl-substituted monomeric phenols and water-insoluble alkyl-substituted polymeric phenols; said protectant being in admixture with an oxygen and carbon dioxide permeable film-forming synthetic polymeric carrier.

3. A process for arresting and substantially counteracting the contamination of vascular plants by atmospheric contaminants which comprises coating at least a surface portion of said plants with an effective amount of a water-insoluble, alkyl-substituted monomeric phenol dispersed in a gas-permeable synthetic polymeric latex carrier.

4. The process in accordance with claim 3 wherein the water-insoluble, alkyl-substituted monomeric phenol is present in an amount from about 0.3 to about 10 grams per 100 milliliters of said latex carrier.

5. The process in accordance with claim 3 wherein the water-insoluble, alkyl-substituted monomeric phenol is present in an amount from about 1 to about 5 grams per 100 milliliters of said latex carrier.

6. The process in accordance with claim 4 wherein the water-insoluble, alkyl-substituted monomeric phenol is 2,6-dimethyl phenol.

7. The process in accordance with claim 4 wherein the water-insoluble, alkyl-substituted monomeric phenol is 2,4-dimethyl phenol.

8. The process in accordance with claim 4 wherein the water-insoluble, alkyl-substituted monomeric phenol is o-cresol.

9. The process in accordance with claim 4 wherein the water-insoluble, alkyl-substituted monomeric phenol is p-cresol.

10. A process for arresting and substantially counteracting the contamination of vascular plants by atmospheric contaminants which comprises coating at least a surface portion of said plants with an effective amount of a water-insoluble, alkyl-substituted polymeric phenol dispersed in a gas-permeable synthetic polymer latex carrier.

11. The process in accordance with claim 10 wherein the water-insoluble, alkyl-substituted polymeric phenol is present in an amount from about 0.3 to about 10 grams per 100 milliliters of said latex carrier.

12. The process in accordance with claim 10 wherein the water-insoluble, alkyl-substituted polymeric phenol is present in an amount from about 1 to about 5 grams per 100 milliliters of said latex carrier.

13. The process in accordance with claim 11 wherein the water-insoluble, alkyl-substituted polymeric phenol is a novolac resin.

14. The process in accordance with claim 11 wherein the water-insoluble, alkyl-substituted polymeric phenol is a phenol-formaldehyde resin.

15. A process for arresting and substantially counteracting the contamination of vascular plants by atmospheric contaminants which comprises coating at least a surface portion thereof with a composition consisting essentially of phenol-formaldehyde resin containing five phenolic residues per molecule and a latex of a 75 to 85 percent vinyl acetate-25 to 15 percent ethylhexyl acrylate copolymer in the relative amounts of from 1 to 3 grams of phenol-formaldehyde resin per 100 milliliters of latex.

16. A process for arresting and substantially counteracting the contamination of vascular plants by atmospheric contaminants which comprises coating at least a surface portion thereof with a composition consisting essentially of phenol-formaldehyde resin containing five phenolic residues per molecule and a latex of a styrene-ethylhexyl acrylate copolymer in the relative amounts of from 1 to 3 grams of phenol-formaldehyde resin per 100 milliliters of latex.

References Cited in the file of this patent

UNITED STATES PATENTS

| | | |
|---|---|---|
| 2,203,274 | Anderson et al. | June 4, 1940 |
| 2,410,792 | Tenbroeck | Nov. 5, 1946 |
| 2,565,998 | Swaney | Aug. 28, 1951 |
| 2,673,824 | Biefeld | Mar. 30, 1954 |
| 2,805,137 | Clopton | Sept. 3, 1957 |
| 2,918,391 | Hornibrook | Dec. 22, 1959 |
| 3,048,563 | Seydel | Aug. 7, 1962 |

FOREIGN PATENTS

| | | |
|---|---|---|
| 662,364 | Germany | July 12, 1938 |

OTHER REFERENCES

Müller, C.: Protecting the Surface of Objects. In Chemical Abstracts, vol. 25, page 4984, 1931.

Koritz, Helen G., and Went, F. W.: Physiological Action of Smog on Plants. In Chemical Abstracts, vol. 47, cols. 4969–i and 4970–a, 1953.